United States Patent [19]

Lemelson

[11] Patent Number: 4,752,808
[45] Date of Patent: Jun. 21, 1988

[54] VIDEO TERMINAL AND PRINTER

[76] Inventor: Jerome H. Lemelson, 48 Parkside Dr., Princeton, N.J. 08540

[21] Appl. No.: 946,869

[22] Filed: Dec. 29, 1986

Related U.S. Application Data

[63] Continuation-in-part of Ser. No. 664,529, Oct. 25, 1984, Pat. No. 4,632,528.

[51] Int. Cl.⁴ .............................................. G03G 15/04
[52] U.S. Cl. ..................................... 355/14 R; 355/7; 355/77
[58] Field of Search .................. 355/14 R, 3 R, 7, 11, 355/5, 14 C, 77

[56] References Cited

U.S. PATENT DOCUMENTS

| | | | |
|---|---|---|---|
| 3,872,462 | 3/1975 | Lemelson | 354/76 X |
| 4,122,462 | 10/1978 | Hirayama et al. | 355/3 R |
| 4,124,286 | 11/1978 | Barasch | 355/3 R |
| 4,167,324 | 9/1979 | Wu | 355/3 R |
| 4,255,040 | 3/1981 | Weigl et al. | 355/3 R |
| 4,371,898 | 2/1983 | Nakamura | 355/7 X |

Primary Examiner—R. L. Moses

[57] ABSTRACT

A xerographic machine and a method for xerographically producing hard copy by direct reflecting illuminative scanning of a hard copy and/or by code signal controlling an alpha-numeric character defining light beam exposing a selenium or cadmium sulfide coated xerographic surface. The light beam generator may comprise a laser or the like which is deflection and/or brightness controlled by signals generated by selectively operating the keys of a keyboard, wherein such signals are reproduced from an electronic memory and/or are received by shortwave or wire, such as in facsimile transmission. The machine is capable of producing copy from composite printed and electronic information, a combination of electronic data sources, keyboard operated means, one or more memories, direct transmitted reception or any combination thereof. In a particular form, the machine is adjacent to or part of a television terminal and may be programmed to automatically receive and xerographically print data transmitted to the terminal on telephone lines or by short wave and to automatically transmit digital or facsimile data.

19 Claims, 3 Drawing Sheets

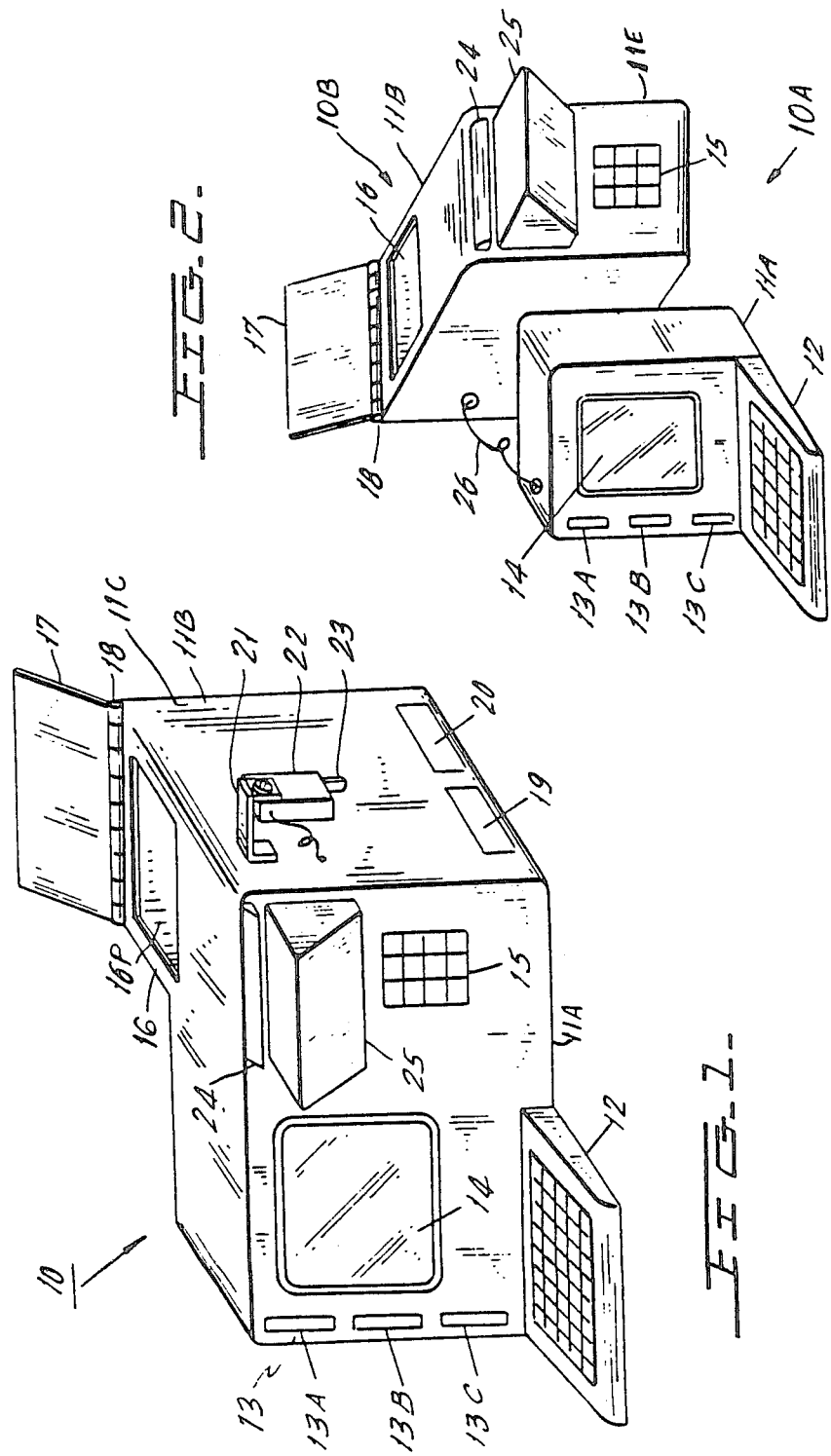

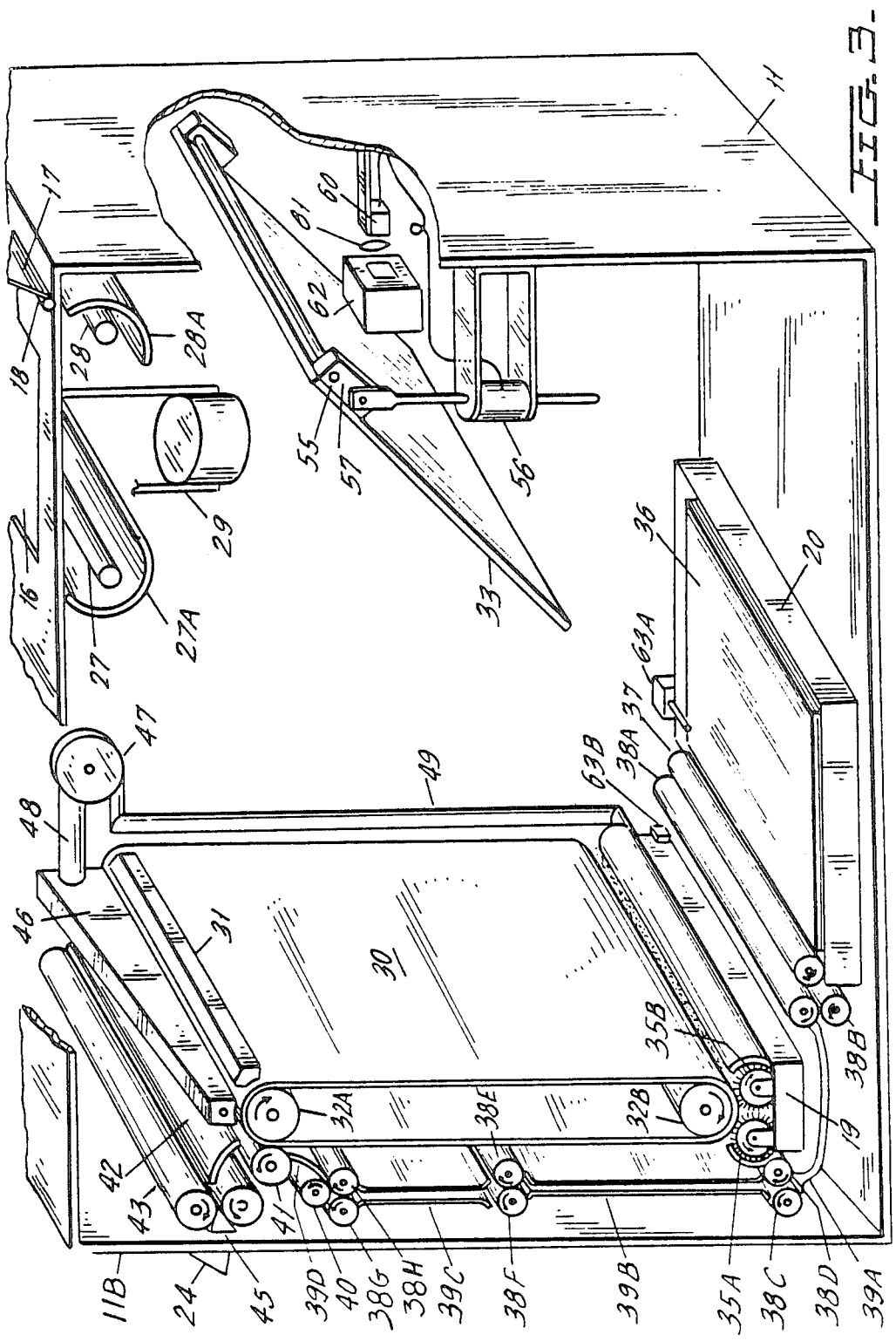

VIDEO TERMINAL AND PRINTER

CROSS REFERENCE TO RELATED APPLICATIONS

This is a continuation-in-part of application Ser. No. 664,529 filed Oct. 25, 1984, now U.S. Pat. No. 4,632,528.

BACKGROUND OF THE INVENTION

1. Field of the Invention

The invention relates to a combined printing device and an information terminal including a digital computer for generating, displaying, manipulating, transmitting and producing hard copy of data which is generated at the terminal and received from one or more memories or remote sources such as other terminals.

2. Description of the Prior Art

The prior art consists of video terminals for generating displaying and manipulating data and for printing hard copy of data displayed by the terminal display. The prior art also consists of xerographic printers of page data.

SUMMARY OF THE INVENTION

This invention relates to hard copy printing machinery and a method for generating hard copy data from a plurality of sources including from other hard copy, or in the form of signals generated by selectively operating the keys of a keyboard, from one or more memories or received data transmitted from one or more remote locations. While the machine may be connected to a terminal and keyboard for hard copy recording of data displayed at the terminal, it may also be supported in the same housing for such terminal.

It is a primary object of this invention to provide a new and improved hard copy producing arrangement and a method for communicating and recording information generated from a plurality of sources.

Another object is to provide a system for generating readable hard copy from a plurality of sources.

Another object is to provide an apparatus which may be used to generate printed copy by selectively operating keys of a coded keyboard or an electric typewriter, as well as from a plurality of other sources of data.

Another object is to provide a video communication terminal which is capable of both human selected and automatic operation for generating prints of data from keyboard operated means, from printed sheets fed thereto and also from remotely generated and transmitted information signals.

Another object is to provide an apparatus for forming composite hard copy from two or more forms of data such as data which is generated or provided from different sources thereof.

Another object is to provide a xerographic machine which is capable of producing hard copy both from reflecting image information off sheet material and from deflection controlled or otherwise configured light, such as generated by a laser wherein such light is used to expose a printing drum, such as a selenium or cadmium sulfide coated drum, to discharge charged portions thereof to form a basis for xerographic printing.

Another object is to provide a xerographic printing arrangement for priting frames or pages of information, such as multiple lines of characters, wherein a printing drum is employed which is step-driven in synchronization with the exposure of its cylindrical printing surface to each line of character generating scanning light.

Another object is to provide a xerographic printing arrangement for use in a general information terminal employing a video display wherein the displayed information may first be generated on the display and then rapidly transferred to a printing drum and printed thereby onto one or more sheets of paper.

Another object is to provide an information terminal which contains means for generating and displaying both keyboard and page data and means for selectively printing such data under the control of the operator of the terminal.

Another object is to provide a xerographic printing machine for printing page data and character data generated in a serial manner wherein a printing drum is employed which may be continuously driven during the printing of each page of data and intermittently driven when exposed to the light defining lines of serially generated characters.

Another object is to provide a video terminal having the capability of displaying and printing page information generated at the terminal, from hard copy which is scanned at the terminal or at a location remote from the terminal.

Another object is to provide a video terminal capable of printing hard copy generated by the terminal and serving as an automatic facsimile receiving and printing machine.

With the above and such other objects in view as may hereinafter more fully appear, the invention consists of the novel constructions, combinations, arrangement of parts and electronic control means as will be more fully described and illustrated in the accompanying drawings, but it is to be understood that changes, variations and modifications may be resorted to which fall within the scope of the invention as claimed without departing from the spirit and nature of the invention.

In a preferred form of the instant invention, a single housing contains a video display unit, such as a cathode ray tube or other form of video signal modulatable display for displaying video information, such as lines of alpha-numeric characters; a coded keyboard with key operated means for generating coded signals representing characters; a buffer memory for receiving signals output by such keyboard and controlling the video display to display the characters represented by the keys which are manually activated; a xerographic printing means including a transparent support for individual pages of printed matter, photographs, drawings, etc. to be printed on blank sheets of paper fed from a removable cartridge supply means insertable into an opening in said single housing; a laser with a beam which may be controlled by signals generated in response to selectively operating the keys of the keyboard which beam may be controlled to operate in synchronism with the stepped and/or continuous movement of a charged belt or drum of a xerographic printer so as to print lines of characters or generate graphs to be printed by selectively discharging the charged endless surface. Suitable controls are also provided for controlling the display device of the video display to selectively display information on its display screen with alpha-numeric character information generated by the keyboard or selectively reproduced from a local master memory or received from a remote source, such as a remote terminal or computer. The xerographic printer may thus print what is displayed either by deflection controlling the laser with signals from the buffer, the master memory or a remote location and/or by light scanning a document disposed on the transparent support. Key switch and/or speech recognition computer controls also include a control means for effecting the superimposing of image information by selectively discharging with light selected portions of the charged surface of the drum or endless recording photosensitive belt of the printer which information is generated by the keyboard or from local or remote memory and/or light scanning the document positioned on the transparent support. The controls also include means for effecting the display of the superimposed information and cursor or otherwise generated control means for moving portions of the superimposed or single image around the display screen.

The invention may also be defined by separate housings communication with each other, one containing a computer and video display together with a keyboard for the manual generation of alpha-numeric characters on the display and effecting various manual control functions associated with the display, manipulation, call up or reproduction from memory, receipt and transmission of data to the other housing and the control of printing means therein and the transmission of digital data from the video terminal to one or more remote locations, the transmission of the data displayed on the display thereof as facsimile and/or digital data and the receipt or call up of data from one or more remote locations for display and use in controlling the printer to print such information. In other words, the single or multiple housings may be employed to perform one or more of such functions as (a) compute and generate character data, (b) compute and generate graphical data, (c) display such data, (d) display images of documents, (e) combine such displayed data in a single display or multiple displays, (f) manipulate such display data on a display screen, (g) control the reproduction of data from a memory or memories and display same, (h) transmit digital data, (i) transmit facsimile data, (j) receive, record display and print data received from one or more remote locations and (k) print either the data displayed on a video terminal or images of documents presented to a xerographic printer. While such data and document image displaying is effected by means of a charge coupled or cathode ray tube video display, the xerographic hard copy printing of such displayed or received data is effected by means of a data signal deflection and intensity controlled laser beam which may operate per se to selectively discharge the charged xerographic recording surface of a xerographic recording drum or endless belt as described which selective discharging may also be effected by conventional light reflecting off the surface of a document disposed on a scanning glass plate of the xerographic printer. Such latter document scanning may be effected prior to and/or after the xerographic drum or belt surface has been selectively discharged with character, graphics or picture information which is preferably, although not necessarily displayed on the display screen of the video terminal of the apparatus to allow the operator to monitor, inspect and manipulate the images displayed before printing is effected.

In yet another form of the invention, the image information displayed on the CCD or CRT video display may be directly scanned, such as by means of suitable fiber optic image forming means such as a fiber optic faceplate forming an optical image thereof at one surface of the faceplate forming while the other end of the fiber optic bundle is optically coupled to the display tube's photphor screen. The image forming face of the faceplate is disposed against or immediately adjacent the moving surface of the xerographic recording surface of the drum or endless belt to receive the light pattern formed at such fiber optic faceplate surface and to be discharged thereby as the xerographic recording surface is driven past the faceplate.

Thus composite images may be formed, displayed and printed on one or more sheets of paper or transmitted in digital and/or analog or facsimile form by electronic image signal generating and transmission per se together with reflection scanning of documents to selectively discharge xerographic recording surface means or a combination of electronic means for displaying and controlling a laser to cause its beam to selectively discharge the xerographic recording surface together with such reflection light scanning of documents. For each of these embodiments of the invention, each of the xerographic recording surface discharging means, (a) light derived from the face of the image tube or video display screen, (b) light derived from reflections of a line source of such light off a document and (c) light derived from a deflection controlled laser beam, may be employed per se or in combination with light patterns generated by the other means.

BRIEF DESCRIPTION OF THE DRAWINGS

FIG. 1 is an isometric view of a first form of the invention defined by a single housing containing a video display and a xerographic printing apparatus for printing copy of the information displayed by the display and printed documents.

FIG. 2 is an isometric view of apparatus of the type provided in FIG. 1 supported by two separate housings.

FIG. 3 is an isometric view with parts broken away for clarity of one form of xerographic printing apparatus applicable to the apparatus of FIGS. 1 and 2.

In FIG. 1 is shown a computer work station 10 defined by a housing 11 supporting and containing various controls displays and a printing means. A manually operable keyboard 12 is shown attached to the front wall 11A of the housing 11 although it may be disposed a distance therefrom on a desk top or table and electrically connected to various computing circuits in the housing 11 as illustrated, for example, in FIG. 2. Notation 13 refers to a storage portion of the housing 11 containing means for receiving and retaining a plurality of magnetic disc drives denoted 13A, 13B and 13C, each of which is operable to receive through a slotted portion of the wall 11A, respective of a plurality of magnetic record discs inserted through such openings to be operatively driven and transduced on or form.

Figure 4:
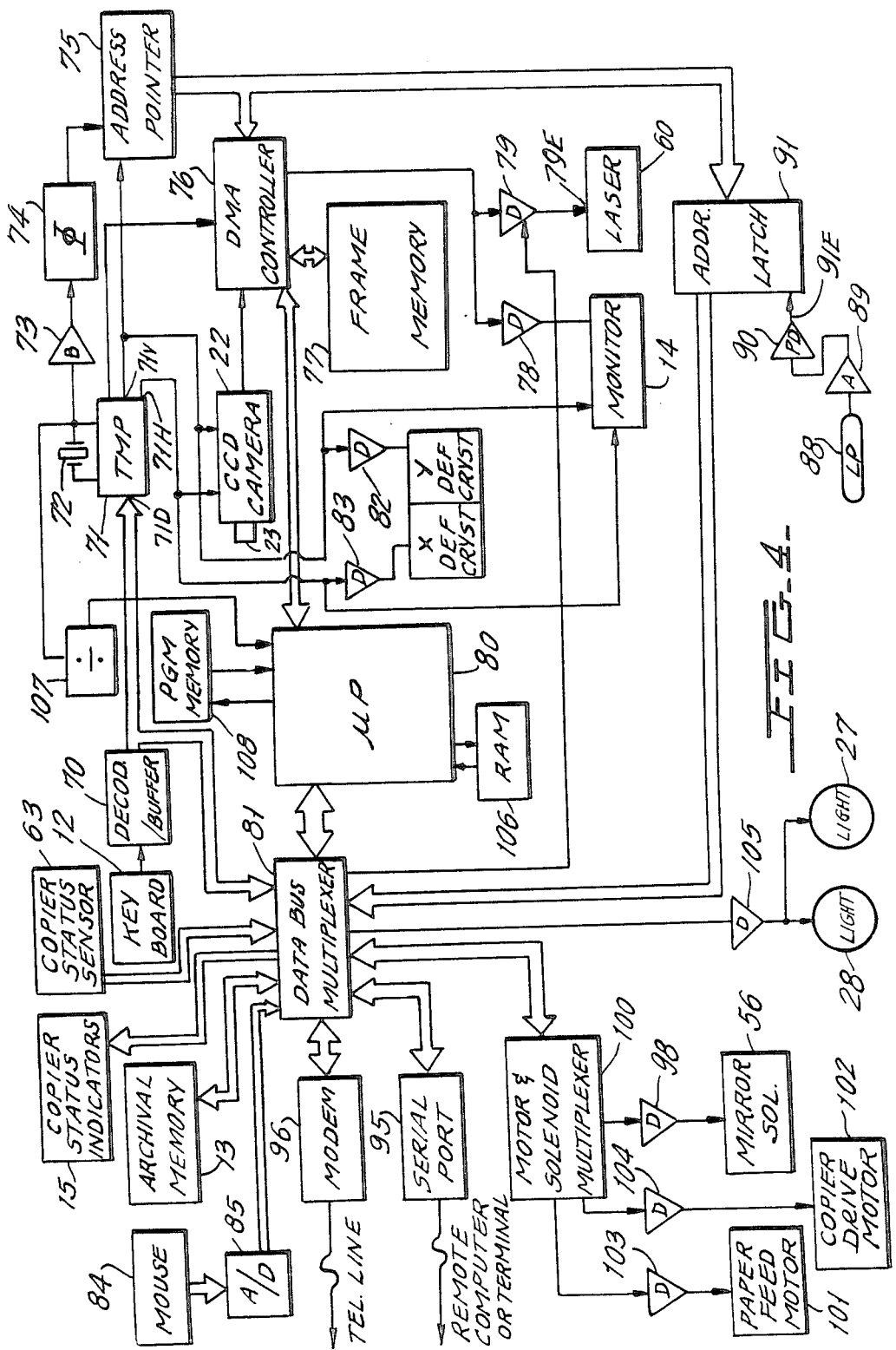
FIG. 4 is a schematic diagram of an electronic control system showing electrical components and subsystems for controlling the operation of a composite xerographic printing and display apparatus such as that shown in FIGS. 1 to 3.

A graphics display monitor 14 in the form of a cathode ray tube, liquid crystal or light emitting diode display screen, is supported by the front wall 11A directly in alignment with the keyboard 12 at one side of the housing 11. A panel of electrically operated indicators 15 is supported across an opening of the front wall 11A or mounted thereon. A transparent document receiving and supporting table 16, including a glass plate 16P, adapted to receive sheets of paper, such as documents and the like, to be copied in a convenient manner when disposed thereon is disposed across an opening in the upper wall of an extension 11B of the housing 11. A pivotted cover 17 is secured by a hinge 18 to one end of the extension 11B of the housing 11 and is adapted to cover a document and force same against the glass plate 16P to effect proper document scanning and reproduction when the xerographic printing means supported within housing extension 11B is properly operated. Notations 19 and 20 refer respectively to either two trays of different size paper or a single paper tray receptacle and a receptacle for printing toner. A bracket 21 is supported by the side wall 11C of the housing 11 and pivotally supports a television camera 22 having an output adjustable focusing lens 23 adapted to scan and generate video images of documents located on the table or bench top adjacent the side wall 11C or a receptacle shelf [not shown] supported by the side wall 11C and extending horizontally outwardly therefrom. Notation 24 refers to a guide for pages of sheets of paper which have been xerographically printed on within the housing 11 and a catch tray 25 or shelf for receiving and retaining such documents. An automatic sheet paper feeder may also be secured to the housing 11 to feed individual sheets of paper, such as respective documents or pages of information, to and from the document table 16 to permit such documents to be automatically printed.

In FIG. 2, two housings 11D and 11E make up the graphics and information terminal 10A which is equivalent in function to that illustrated in FIG. 1. A xerographic printer assembly 10B is provided in its own housing 11E separate from a second housing 11D containing the described keyboard 12, video monitor 14 and suitable electronic computing and control circuits for performing the functions to be described in response to the selective operation of the keys of the keyboard and other control means to be described. A flexible cable 26 is plugably connected to connectors secured to both housings 11D and 11E for communicating information generated by the selective operation of the keys 12K of the keyboard 12 to motors and control means located within housing 11E.

In FIG. 3 is shown details of optical and xerographic printing components of a page or sheet printing device located either within the extension 11B of housing 11 of the terminal 10 of FIG. 1 or the printer housing 11E of FIG. 2. Certain details of the printing paper guide and drive means are not shown, for clarity, and may be provided in accordance with structures well known in the art for driving and guiding paper along a selected path or paths as described. The arrowhead notations are employed to indicate the rotational direction of certain of the rollers and brushes illustrated in FIG. 3.

In a first mode of operation involving the use of the printing apparatus in housing 11 for copying documents disposed across the opening 16 in the top wall of housing 11, elongated light sources or lamps 27 and 28 are supported parallel to each other within the housing and provide suitable document illumination by means of respective reflectors 27A and 28A which receive and properly direct the illumination from the lamps against the document is focused by a lens 29 onto a flexible belt 30, such as a sheet of stainless steel or other suitable material coated with a suitable photoconductor, such as selenium or cadmium sulfide or other conducting material. In preparing the belt to receive and temporarily record image information to be printed, such belt 30 is driven adjacent a Corona discharge electrode 31 by the motorized rotation of belt support and drive rollers 32A and 32B. Such discharge forms a layer of positive charge in the photoconductor coating on the belt 30. When the charged belt 30 is exposed to illumination reflected off the document, white or bright light areas in the image field cause the photoconducted surface of the belt to selectively become discharged. After an appropriate exposure time, lamps 27 and 28 are automatically turned off and belt 30 is controllably driven or advanced by the rotation of rollers 32A and 32B. Charged and discharged areas of the belt 30 attract and repel negatively charged particles of printing material supplied to the belt 30 from a reservoir or tray 19 by means of conventional magnetic brushes 35A and 35B. Those areas of the belt containing positive charging, attract the dark colored or black particles of toner.

Simultaneously as the belt 30 is driven and selectively discharged, a sheet of paper 36 is automatically withdrawn from paper supply tray 20 by a paper feed roller 37 and is fed therefrom between rollers 38A and 38B which feed the paper through a paper guide 39A between respective rollers 38C and 38D, which, in turn feed such paper 36 to rollers 38E and 38F through a guide 39B, which latter guide feeds the paper sheet through a third guide 39C to drive rollers 38G and 38H. As the paper sheet 36 exists rollers 38G and 38H, it is fed into guide 39D by roller 40. Guide 39D brings the paper 36 into contact with the toner-formed document image of the belt 30. The paper is pressed into firm contact with the image generating material on the belt 30 by a roller 41. As the paper sheet exits roller 41, it encounters paper guide 42 and thereby is deflected onto a pair of hot rollers 43 and 44. Heat and pressure between these latter rollers, permanently bonds the toner to one side of the paper sheet 36. Sheet 36 exits housing 11 through a slotted opening 45 in the front wall 11B of housing 11 and is deflected downwardly by guide 24 into a receptacle or catch tray 25, illustrated in FIGS. 1 and 2.

To complete the copy cycle, belt 30 is driven beneath a vacuum hood 46 which contains a rotating brush, not shown, but located within such hood. A high volume vacuum pump 47 draws air through hood 46 and an inlet pipe 48. The combined action of the brush located within housing 46 against belt 30 and the vacuum or suction generated within the vacuum hood 46, serves to clean the surface of the belt 30 of residual toner particles. The scavenged toner particles are then returned to the toner tray 19 by a return pipe 49.

When it is desired to effect printing of computer generated images, lamps 27 and 28 are extinguished or not activated and a mirror 33 is rotated to a horizontal position about a horizontal axis defined by a shaft 55, the ends of which are supported by the side walls of housing 11. A solenoid 56, which is supported on a bracket 56B extending to a wall of housing 11, serves to effect such pivotting drive of the mirror 33 about its axis, when activated. Notation 57 refers to brackets disposed at each side of the mirror 33 for pivotally supporting the mirror on the shaft 55 and the output shaft of the solenoid 56.

When the mirror is so pivotted and the light path is so cleared, picture or image representing electrical signals are generated from a buffer or memory and are used to amplitude modulate a solid state laser 60, wherein the output of the laser, a beam of coherent radiation is passed through a collimating lens 61 supported by a bracket extending from a side wall of the housing 11. The modulated laser beam is made to scan the entire image area, preferably in a raster type of scanning motion, by the automatic operation of a scanning mechanism 62 which may comprise a pair of KDP crystals, which crystals electro-optically bend the path of the beam in accordance with the application of scanning signals thereto. Such scanning mechanism is known in the art as are other forms of mechanical scanning systems utilizing power rotated mirrors and prisms. The projected, raster scan and image information modulated laser beam is directed against the photoconducting material coating the moving belt 30 as described above, to selectively discharge portions of the belt and develop a suitable image charge pattern therein to properly attract printing particles and effect the printing of image information on the sheet of paper fed to the belt, as described, from the particles selectively disposed against the surface of the belt.

Also illustrated in FIG. 3 is a sensor 63A for sensing when the paper in the supply tray has run out. A second sensor 63B, determines when the supply of toner in its reservoir is low or the reservoir is substantially out of such toner. Additional sensors may also be utilized to effect suitable automatic control and indication of the operation of the xerographic printing mechanism.

FIG. 4 schematically illustrates a diagram of the electronic and electro-mechanical components of system 10. In a typical mode of operation, characters defining information to be printed on a sheet fed to the printing apparatus described, may be defined by electrical code signals generated by selectively manually operating selected keys 12K of the keyboard 12. The signals output by the selective operation of keyboard 12 are conducted to a decoder and buffer memory 70, as they are generated, and the output of the buffer 70 is immediately applied to a terminal management processor 71. The processor 71 provides all of the character, video and raster scan signals necessary to display the information to be printed on the display screen of monitor 14. Video information in the form of video frame picture signals, appear at a data connection 71D and are preferably in the form of digital video signals wherein a code defining a digital signal representation of the number "1" defines a white area or pixel on the video screen while a "0" or lack of digital signal represents a black or unenergized area or pixel. An output 71V of the terminal management processor 71 is energized with vertical sync signal video information while a second output 71H thereof contains horizontal sync video information. A crystal 72 defines part of an internal oscillator in the terminal management processor 71 and provides accurate, stable sync signals to properly control the video display of information.

The oscillator signal from the terminal management processor 71 is tapped by a buffer-amplifier 73 and is converted by a phase locked frequency generator 74 having a phase locked loop, to a frequency which is equivalent to the generated video pixel scanning rate for the resolution of the display screen, approximately 10-15 megahertz to provide good quality character resolution. The output of the generator 74 forms the clock input to an address pointer 75, such as a binary counter. The vertical sync signal output by the terminal management processor 71 is used to reset the address pointer at the beginning of each new frame of video information generated, thus insuring stable video signal synchronization.

The output of address pointer 75 is signals defining a digital representation of the instant or current location of the pixel being scanned and is employed, by means of a direct memory access controller 76, to open or properly condition the appropriate memory location in a frame memory 77 for reproduction therefrom. The "white" or "black" video information required for properly activating the pixel being scanned under the control the terminal management processor 71, is transferred to the open or recording location in the memory 77 through the direct memory access controller 76. The contents of the currently open storage location of memory 77 are also simultaneously output by the direct memory access controller 76 to a video driver 78 and are conducted therefrom to the monitor 14 in a manner to display such information on the display screen thereof for viewing by the operator. The signal output from the direct memory access controller 76 is also output to a driver 79 for laser 60 so as to provide suitable modulation of the beam output by the laser whenever the driver 79 is enabled by a true signal applied to the driver enabling input 79E, as generated by a microprocessor or computer through a data bus multiplexer 81.

Scanning synchronization for monitor 14 to provide proper image generation on its display screen, is derived directly from outputs 71H and 71V of the terminal monitor processor 71. Deflection control signals for the Y-directional positioning of the beam of the laser 60 against a select portion of the field defining area of the xerographic belt 30 is effected by the signals output by a vertical ramp generator and driver 82 applied to a Y-deflection control crystal 62B. Y-directional synchronization is provided on the output 71V of the terminal management processor 71, which generates a synchronizing signal which acts as a trigger for the ramp generator 82. X-direction positioning control of the beam of the laser 60 is effected by the signal output by the horizontal ramp generator and driver 83 applied to X-deflection control crystal 62A. X-direction synchronization is provided by the signal output on 71H of terminal management processor 71, which signal triggers the operation of a ramp generator 83.

Graphics data may be directly recorded in frame memory 77 as output from microprocessor 80 to the direct memory access controller 76. Such data may be generated by a number of means including a manually operated mouse-type of controller 84 which may be hand directed along a surface of the table or bench supporting the housing 11 or a tablet. The analog position defining signal generated on the output of a mouse 84 is converted to digital form by an analog-to-digital converter 85 and is conducted to a data bus multiplexer 81 resulting in the provision of selected information at a microprocessor 80 for processing and application to the frame memory 77 via the direct memory access controller 76.

Another means for generating graphics information is by means of a light pen 88 which is selectively placed by hand against selected areas of the monitor screen 14. Such light pen consists of a photosensor, such as a phototransistor, and an appropriate focusing lens or lens system. The output of the light pen 88 is amplified by an amplifier 89 the output of which is input to a thresholding pulse discriminator 90. Appropriately narrow pulses which are indicative of monitor screen scanning by its write beam, are detected and cause a true enabling signal to be transferred to the write enable input 91E of an address latch 91. When the raster scanning write-beam of monitor 14 intersects the location of the light pen 88, the pixel position represented by the output of pointer 75 is latched by address latch 91 and simultaneously output to microprocessor 80 through multiplexer 81 for further processing.

A third graphics input means is provided in the form of the keyboard 12. To facilitate the recognition of these control sequences, the output of the decoder-buffer 70 is directly available to the microprocessor 80, via multiplexer 81.

When a complete video frame has been properly composed by the operator, as indicated on the display screen of the video monitor 14, such information may be permanently stored in one of the archival memories or discs of the archival memory means 13, by transferring the information stored in the frame memory 77 through the controller 76 and microprocessor 80 to such archival memory, which may comprise a magnetic recording disc, tape or solid state memory forming part of such archival memory.

An additional source of graphics information may comprise prerecorded information generated on the output of one of the memories of one of the devices forming the archival memory 13, and transferred via microprocessor 80 and controller 76 to the frame memory 77. Additional information may also be accessed from a remote computer or terminal via a serial port 95 by means of a hard wire link or other form of information channel. Such information may be accessed, received and transmitted by microprocesor 80 to the multiplexer 81 together with other information formats transmitted thereto from other sources. A modem 96 is provided for the remote access of information from other computer systems and nonrelated sources, thus providing ASCII or graphics communication standards which have been established.

When a graphics defining frame is properly composed, a hard copy of such frame information may be provided by suitably activating keys of the keyboard 12 in a manner to enable the laser driver 79 and mirror solenoid 56 to be properly operated by signals received from microprocessor 80 and conducted on the multiplexer 81 and a further multiplexer 100 for applying such signals to a motor and solenoid driver 98. Such procedure, which includes the selective operation of character defining code keys of keyboard 12, will effect the selective printing of laser generated characters against the xerographic belt as described, wherein such laser information results from selectively discharging with laser light, selected portions of the belt such as band areas thereof defining lines of alpha-numeric characters. When character information defining one or more characters, lines, groups of lines or paragraphs or pages has been so recorded on the belt, microprocessor 80 operates to control the operation of a paper feed drive motor 101 and copier belt drive motor 102 which are properly driven by signals generated by the microprocessor, applied therefrom to the multiplexer 81 which directs such signals through a second multiplexer 100 to respective motor drivers 103 and 104. Suitable print cycle control is thus affected as previously described.

The status of the operation of the copier may be monitored under the control of a microprocessor 80 which receives signals output by sensors 63 and other sensors (not shown) transmitted by the multiplexer 81 and indicative of such variables as the condition of paper jams within the machine, supply of toner, one or more paper jams within the machine, etc. Such control functions are common and known in the art. Indications of the status of the copier may thus be provided by selectively activating individual indicators of the bank 15 of such indicators under the control of the microprocessor 80. The microprocessor 80 also operates to activate controls for energizing and deenergizing the illumination lamps 27 and 28 through a lamp driver 105 connected to the multiplexer 81.

Temporary scratch-pad memory for the operations controlled by the microprocessor 80, is effected by means of a random access memory or RAM 106. Timing and synchronization of the operations of the microprocessor 80 is provided by signals generated by the crystal oscillator 72 of the terminal management processor, wherein such signals have been appropriately conditioned by a divider 107. Encoded instructions recorded in a program memory 108 provide sequencing and operation controls. Such memory 108 may be nonvolatile as defined by a read-only-memory or ROM or may be down-loaded into a RAM type memory from the archival memory 13 when the system is energized or under the control of the operator.

In the described electronic computing and control system. It is assumed that suitable operational power supplies are provided of proper polarity on the correct sides of all electronic components, subsystems and devices to effect the modes of operation described. It is also noted that the described photoconductor containing endless belt may be replaced by a conventional photoconductor coated power rotated drum for similarly receiving and transferring image information xerographically to one or more sheets of paper as generated by the selective activation of keys of the keyboard 12, from one or more local memories or computers, from the output of the television camera 22, from one or more local or remote sensors or from one or more remote memories or computers which may automatically transmit information to a receiver and record it in one or more of the archival memories 13A, 13B or 13C under control of the microprocessor 80 through data bus multiplexer 81. Such information may also be accessed by properly activating keys of the keyboard 12 for generating telephone line connection and control signals in an automatic telephone switching and connection system coupled or connected to the microprocessor 80 through a suitable modem, as described, wherein line connection to a remote computer and memory is so effected and accessed to selected information in its memory bank or output is attained by the operator of the system 10 for generating and effecting the transfer and transmission of such selected data to system 10 and through the microprocessor 80 to the archival memory 13 or one of the additional memories connected to the microprocessor.

In yet another form of the invention, the pivoted cover 17 which is operable to bear against a document disposed on the glass plate 16P across the opening 16 of the housing extension 11B may itself contain or comprise a suitable light emitting video display such as a plasma display, light emitting diode display, cathode ray tube of the like for displaying character and/or graphical information generated by selective operation of the keys of the keyboard 12, from memory, a computer, television camera, disc or tape recorder-reproducing unit, mouse, light pen or other device. The light generated by such cover containing display may be employed to selectively discharge the charged belt 30 or the charged surface of a xerographic drum, if used in place of the belt, to provide desired image information to supplement or be combined with or superimposed on the information generated by the laser as described and/or by light scanning the document placed on the glass plate 16P. If the document is light transmitting, such as a transparency, then the light pattern generated by the flat panel display forming or attached to the cover 17 may simultaneously discharge the belt 30 or drum. If the document is opague, the cover mounted display may operate to form part of the image to be printed when the document is removed from plate 16P. It is also noted that the described laser beam image forming means may be operated simultaneously as a document on plate 16P is light scanned to form a composite image as described by providing a suitable manually operable switch or computer operated switch and control means in the microcomputer 80 for simultaneously reproducing the selected video information signal from memory snf controlling the described means for effecting light scanning of a document disposed on the plate 16P.

In yet another form, the transparent plate 16P may be replaced by a transparent flat video display, such as a plasma,CCD, LCD or other suitable display through which light from the light scanned document may pass to the mirror 33 for the simultaneous or sequential discharging of the charged belt 30 to provide superimposed information thereon and composite images.

Various techniques and systems are known in the art for deflection controlling and intensity modulating light beams such as generated by lasers and the like. Reference is made to U.S. Pat. No. 4,121,249, the references thereof and other U.S. patents for details of such other techniques employable to properly deflection control and modulate or gate the laser beam employed herein to generated character, graphical and photographic image information and temporarily record same in the charged belt 30 or xerographic drum if employed to replace the belt.

It is also noted that the video image displayed on the display of the video monitor 14 and derived from video signals such as video digital signals recorded in the memory or generated by selectively operating the keys of the keyboard, a television camera or other means or combinations of such signal generating means and combined on the display by conventional means, may be manipulated such as by rotating, shifting, enlarging or reducing same prior to utilizing the information defining same to produce the composite hard copy as described. Reference is made to U.S. Pat. No. 4,432,009 for one technique for rotating television images using a prefilter which may be employed to vary the video information displayed before it is recorded as hard copy as described. Other known means may also be employed to selectively change or vary the image or images which are used to effect such composite hard copy either before the composite image is generated or thereafter.

Additional forms and modifications of the invention described are noted as follows:

1. A select area or areas of the endless belt 30 cord xerographic drum may be selectively erased of information temporarily recorded therein by means of light reflected from a document placed against the transparent plate 16P or by means of light scanned thereagainst as generated by the laser 60 or a combination thereof, by selectively operating the laser 60 or by recharging such select area or areas by controlling the operation of the corona discharge electrode 31 as the xerographic belt or drum is driven therepast under the control of computer or microprocessor 80 in accordance with control signals generated by selectively operating the keyboard 12 and/or mouse 84. Band-like areas of the endless belt or drum may thus be selectively discharged/or charged to effect the selective erasure thereof as required and image information, such as one or more characters or lines of characters may be recorded by laer 60 on such erased area or areas by the selective operation of the keyboard 12, as described. Such corona discharge electrode and/or a positive charging electrode may be of substantially shorter length than the width of the belt or drum, such as the length of a character, and may be selectively driven laterally across the belt or drum by a reversible gearmotor (not shown) controlled in its operation by the computer in accordance with its processing of signals generated by the keyboard which indicate the location and extent of the area or areas to be so charged or erased of previously recorded information.

2. If the electro-optical scanning means employed to scan documents disposed against the transparent plate 16P includes television camera 22, such camera may be selectively operated to generate video picture signals of the documents it scans and to selectively apply such video signals to generate images of the scanned documents on the display screen of the monitor 14 to allow the operator thereof to view the images of both the document and characters or graphical information generated by the selective operation of the keyboard 12 and mouse 84 from either archieval memory 13 or directly from the coded keys of the keyboard 12. Television camera 22 may also be controlled to scan select portions of documents disposed against transparent plate 16P and to apply the video signals so generated to to intensity modulate the beam of the laser 60 as it scans the belt or drum to record information on a select portion or portions thereof defined by the select portion or portions of the document scanned by the camera. The video signals so generated may also be processed to enlarge, reduce or otherwise predeterminately change the image recorded by the laser 60 under the control of such video signals, on the belt or drum. In other words, the discharging of the belt or drum may be so effected to provide a xerographically printed document at least a portion of which is derived from the video signals output by the television camera but is not the same size or exact composition of the original image of the document presented against the transparent plate 16P.

3. Television camera 22 may also be operated in a mode to generate video signals which may be processed and transmitted under control of the computer 80 through the data bus 81 to the modem 96 to permit the work station and system 10 to be operated as a facsimile signal generator and transmitter for transmitting facsimile information defined by documents disposed against transparent platen 16P and/or character or graphics information generated by the selective operation of the keyboard 12 and mouse 84 to be transmitted on wire or telephone lines to e remote terminal or telephone cirvcuit containing a facsimile recorder or apparatus similar to that shown in the drawings.

I claim:

1. A method of generating and printing hard copy comprising:

(a) scanning a sheet of printed information with a source of light and reflecting said light from said sheet onto the light sensitive surface of a rotating xerographic drum to selectively discharge said surface with said selected light, (b) generating information signals from a source of such signals and employing same to control the operation of a laser to cause the beam of said laser to selectively scan the surface of said rotating drum so as to provide an exposure thereof which is a modification of the exposure formed in step (a), (c) forming a composite exposure of said light sensitive surface of said drum, (d) erasing a select portion of said composite exposure, and (e) forming a composite hard copy by xerographically printing a sheet with the image information recorded on the surface coating of said drum.

2. A method in accordance with claim 1 wherein said laser is controlled to provide alpha-numeric character recordings in selected portions of the light sensitive coating on said drum.

3. A method in accordance with claim 1 wherein the modification effected by step (b) is superimposed over the recording effected by step (a).

4. A method in accordance with claim 1 including erasing a select portion of said composite exposure on the surface of said drum prior to forming said composite hard copy.

5. A method in accordance with claim 4 including providing a select recording of select information along the portion of said composite exposure which is selectively erased from said drum.

6. A method in accordance with claim 5 wherein erasure is effected of said select portion of said composite exposure by uniformly charging said select portion.

7. A method in accordance with claim 5 wherein said select recording of information along said portion of said drum which is erased is effected by means of a laser scanning and selectively discharging said select portion with intensity modulated light thereof.

8. A method in accordance with claim 7 wherein said laser is controlled to effect said select recording of information along said portion of said drum by signals generated from a memory.

9. A method in accordance with claim 1 wherein a select portion of said sheet of printed information is scanned to the exclusion of other portions thereof to selectively discharge a select area of said xerographic drum.

10. A method in accordance with claim 1 which includes selectively manipulating the image of said printed information scanned before applying the scanned information to discharge said xerographic drum by performing one or more of the operations of enlarging, reducing, distorting, darkening, light enhancing or otherwise changing same.

11. An information handling work station comprising in combination:

(a) a television terminal having an image viewing display screen, (b) an electronic central processing unit defining an electronic digital computer having input and output means, (c) a manually operable keyboard having coded key switch means for generating, when respectively activated, respective code signals defining alphanumeric characters, (d) buffer memory means and control means therefor connected to the output of said keyboard and the output of said electronic computer for receiving information signals generated by selectively operating the keys of said keyboard and said computer and controlling the display of said television terminal with signals reproduced from said memory means to cause said display to display selected information, (e) first control means operable by selectively operating said keyboard for controlling said computer to cause it to generate and transmit selected information signals to said buffer memory means for displaying selected information on the screen of said display, (f) second control means for transmitting information generated by selectively activating the keys of said keyboard to said buffer means to permit said buffer means to control said display to display such information on the display screen of said television terminal, (g) xerographic printing means for generating hard copy including a printing drum having a chargable peripheral surface which may be discharged by light energy directed thereagainst, (h) document support means for supporting a document and reflex light scanning means for scanning said document and directing light reflected off the document supported by said support means to said drum and means for rotating said drum in synchronization with the operation of said scanning means to selectively discharge the drum in accordance with variations in the light reflected from a document, (i) light beam generating means operable to generate and direct light energy against a select portion of said drum and control means for controlling the light beam generated thereby to cause it to discharge select areas of said drum in the configuration of select characters, (j) first means for controlling said light beam generating means to generate and direct light against said drum for discharging said drum in the configuration of characters so as to generate lines of characters defining charge patterns on the surface of said drum, (k) said first control means being operable in response to the operation of select keys of said keyboard, (l) selection control means for controlling said light scanning means for scanning a document and said light beam generating means to selectively operate and discharge said drum either in scanning a document supported by said support means or in controlling said light beam generating means to cause it to generate and direct a beam of light against said drum, (m) supply means for hard copy sheet material, (n) means for selectively feeding said sheet material in the printing operation past said drum, (o) xerographic printing means for supplying particulate ink material to said drum after it is selectively discharged and for printing said particulate material against sheet material fed to said drum in accordance with the ink pattern applied to said drum, (p) selectively operable first means including a television terminal circuit of an automatic television switching system and a modem coupled to said terminal circuit, (q) selectively operable second means for generating video signals of information displayed on the image viewing screen of said television terminal, processing said video signals in a manner to operate said modem to permit it to generate video signals on the output of said television terminal circuit for transmission to a select remote terminal circuit of said automatic telephone switching system.

12. An apparatus in accordance with claim 11, said selectively operable first means including a telephone terminal circuit and a modem coupled to said terminal circuit, selectively operable second means for generating video signals of information displayed on the image viewing screen of said television terminal and, processing said video signals and applying the results thereof to said modem to permit said modem to generate signals on said telephone terminal circuit to a select telephone terminal circuit defining said remote location.

13. An apparatus in accordance with claim 11, said selectively operable first and second means being controlled in their operation by said computer.

14. An apparatus in accordance with claim 11 including means connected to said modem for receiving and recording information transmitted to said work station from a remote location, and means for applying received and recorded thereby to generate visually readable information on said display screen of said television terminal.

15. An apparatus in accordance with claim 11 including means for selectively reproducing information received and recorded from a remote location and applying same to said means for controlling said light beam generating means to effect the hard copy printing of said select information by said xerographic printing means after said drum is selectively discharged by the light of said light beam generating means under the control of information signals derived from information received from said remote location.

16. An apparatus in accordance with claim 11 including selectively operable means for erasing select areas of said drum containing portions thereof charged and discharged.

17. An appartus in accordance with claim 11 wherein said means for erasing select areas of said drum comprises a corona discharge electrode movably supported for movement in a select path across said drum, means for driving said electrode back and forth across said drum, first control means for said driving means and second control means for energizing and deenergizing said electrode and means for controlling the operation of said first and second control means in synchronization with the driving operation of said drum to operate said electrode in charging select areas of said drum after said select areas have been selectively discharged with information.

18. A communication system comprising in combination:
(a) a video terminal having a video display screen,
(b) manually operable means for causing said display screen to display select information,
(c) xerographic printing means operable to print image information displayed on said display screen of said video terminal,
(d) document receiving and scanning means for positioning and scanning a document and applying at least a portion of the image of said document to said xerographic printing means to cause it to print at least part of the portion of the image received thereby from said scanning means, and
(e) means for predeterminately applying combined image information displayed by said video display as generated by said manually operable means and said scanning means to said xerographic printing means so as to cause said printing means to print composite image,
(f) selectively operable first means including a telephone terminal circuit, an automatic telephone system connected to said terminal circuit, a modem operable to receive, convert and transmit video signals to said terminal circuit and said automatic telephone system, and
(g) selectively operable second means for generating video signals of the information displayed by said video display screen, processing and applying said video signals to said modem to permit said modem to apply signals defining the information contained in said video signals to said telephone terminal circuit for transmission to said automatic telephone system.

19. A video terminal in accordance with claim 18 wherein said xerographic printing means includes a laser and means for operating said laser in accordance with signals generated by selectively operating said manually operable means to cause said laser to cause said xerographic printing means to print select image information along select portions of a printed document.

* * * * *